United States Patent [19]

Masterson

[11] 4,239,239
[45] Dec. 16, 1980

[54] PHONOGRAPH TONE ARM SYSTEM

[75] Inventor: Earl E. Masterson, Minneapolis, Minn.

[73] Assignee: Masterson Engineering Inc., St. Louis Park, Minn.

[21] Appl. No.: 52,730

[22] Filed: Jun. 28, 1979

[51] Int. Cl.³ .............................................. G11B 03/38
[52] U.S. Cl. ................................................. 274/23 A
[58] Field of Search ........................... 274/23 R, 23 A

[56] References Cited

U.S. PATENT DOCUMENTS

| | | | |
|---|---|---|---|
| 3,390,886 | 7/1968 | Rabinow | 274/23 A |
| 3,479,038 | 11/1969 | Eisner | 274/23 A |
| 4,087,095 | 5/1978 | Koda | 274/23 A |

Primary Examiner—Charles E. Phillips
Attorney, Agent, or Firm—Charles G. Mersereau

[57] ABSTRACT

An improved phonograph tone arm device is disclosed in which the pickup, including the stylus, is supported on a low friction air-bearing support which provides for essentially frictionless movement of the tone arm and pickup both in horizontal linear travel and vertical pivoting to assure proper stylus pressure. The tone arm support system includes a support member having an upper surface which is shaped as a right circular trough or cylinder section and a floating member which has a juxtaposed matching convex or concave lower surface. A recess in the lower surface of the floating member forms a plenum to which air is supplied from one or more openings in the support member. The length of the plenum is such that the supply openings are always beneath the plenum confines during the full traverse of the stylus across a record to be played to minimize the amount of air required and maximize uniformity of support for the floating member. Alternate embodiments allow either the upper or lower surface of the record to be played.

9 Claims, 7 Drawing Figures

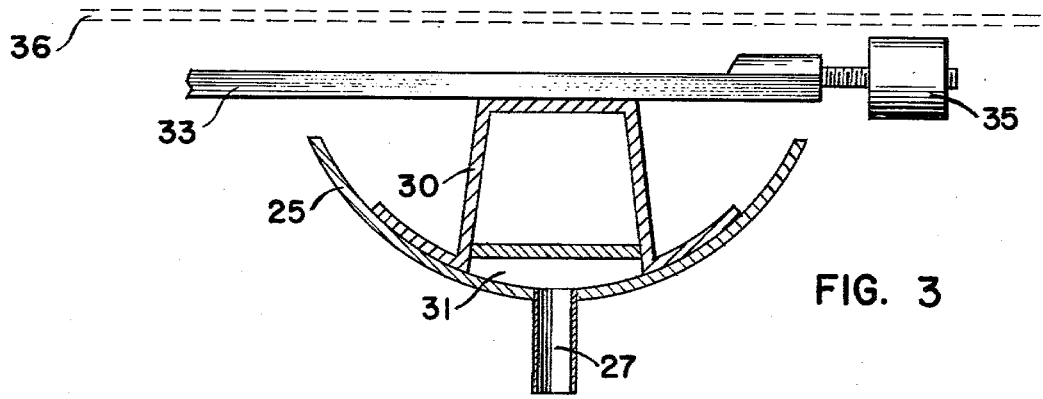
FIG. 3
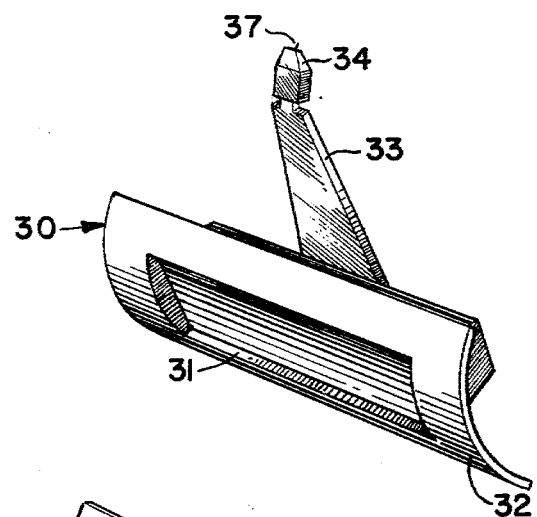
FIG. 2
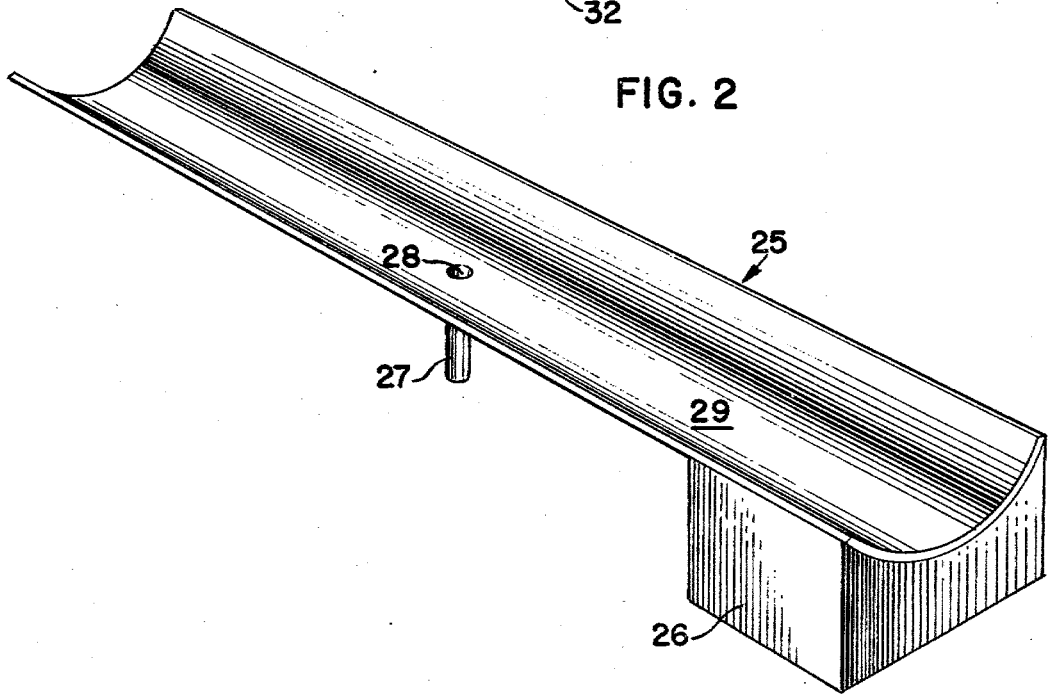

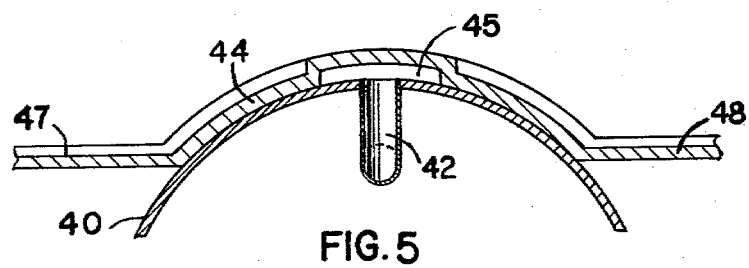
FIG. 5
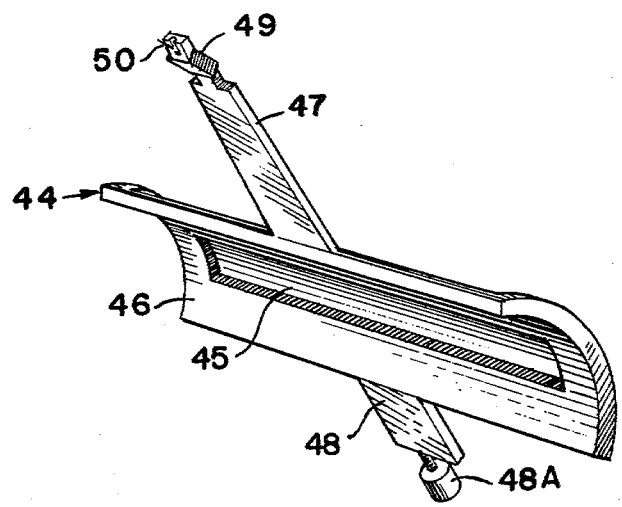
FIG. 4
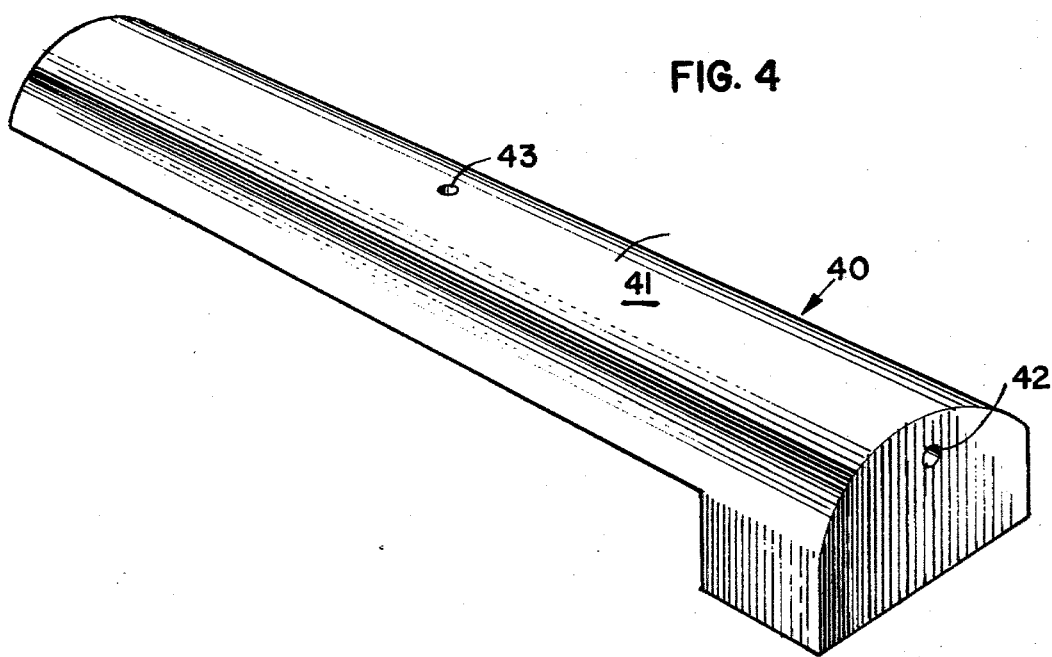

PHONOGRAPH TONE ARM SYSTEM

CROSS-REFERENCE TO RELATED APPLICATION

Reference is made to a copending application of Earl E. Masterson, the inventer in this application, filed of even date, U.S. Ser. No. 052,731 and assigned to the same assignee as the present application. That application (entitled "Phonograph Tone Arm Control System") is directed to a control system for a low friction tone arm which may be utilized to provide control for the tone arm of the present invention. The present invention, on the other hand is directed to the tone arm system itself. To the extent necessary the aforementioned co-pending application is deemed to be incorporated by reference herein.

BACKGROUND OF THE INVENTION

The present invention relates generally to an improved phonograph tone arm and, more particularly to a gaseous fluid supported, low-friction, radially travelling tone arm having increased fluid efficiency and uniformity of support which can be adapted to play either the top or bottom surface of a phonograph record.

DESCRIPTION OF THE PRIOR ART

It is generally known that master records from which copies to be played on phonographs are pressed are produced by a cutter which describes a spiral groove by moving in a radial path with respect to the center of the record as the master is rotated at a constant speed. Because the recording is produced in this fashion, it logically follows that the most accurate subsequent reproduction by a phonograph is one wherein the stylus also moves radially with respect to the center of the record, i.e., with the axis of the tone arm perpetually tangent to the groove. In addition, to prevent distortions in reproduction caused by unwanted side pressures in the groove, it is desirable that the tone arm and thus the stylus be as free to move radially as possible. If the tone arm tends to "skate" inward toward the center of the record or tends to "drag" toward the outside, serious audio and/or excessive record wear distortions may result from a failure of the stylus to properly center in the groove.

It is also well known that both the records themselves and the turntables on which they are mounted, in rotating, do not describe a perfectly flat path. Records often become warped and rotating turntables often have undesirable wobbles. While great strides have been made in reducing the mass of the assembly and in counterbalancing tone arms which enable present phonographs to maintain a vertical pressure in the order of a fraction of a gram, prior art tone arms generally lack the ability to precisely follow the vertical irregularities of the groove. This introduces other forms of audio distortion.

The conventional pivotally mounted tone arm pickup, while generally satisfactory for the casual listener, introduces reproduction errors of all three types described above which are most disturbing to discriminating hi-fi buffs. Because the tone arm pivots about a single remote point, the path it describes across the record is in the nature of an arc rather than a radial path and the sytlus moves in a path tangent to the groove at but one point in the path. Such pickups also tend to skate in their path across the record and create additional distortion.

The prior art is replete with numerous attempts to correct one or more of these difficulties. One such attempt is illustrated and described in a patent to Rabinow, U.S. Pat. No. 3,390,886 which discloses in one embodiment a radial path phonograph pickup in which a counterbalanced, curved sheet member carrying the stylus rests on a curved, porous metal surface. Air supplied through the porous surface supports the pickup in a manner which allows transitional and limited vertical pivotal motion along a radial path.

Another type of prior art radial phonograph pickup system which also discloses an air-bearing is in a patent to Eisner U.S. Pat. No. 3,479,038. In Eisner's preferred embodiment the tone arm is cantilevered at one end of a shaft which is, in turn, carried free to pivot and slide in a perforated sleeve tube of slightly larger diameter mounted in an air plenum. While the tone arm pressure apparently is compensated, the varying longitudinal cantilever moment tending to pivot the shaft along its axis within the sleeve is not.

While the prior art systems achieve a degree of advantage over the earlier pivotal tone arms all suffer from undesirable disadvantages. Prior art air-bearing systems in the case of porous metal diffusers or a sleeve of performations which extend beyond the object supported depend on the production of a uniform pressure profile to produce uniform support and the continued escape of air from uncovered portions not only increases the required capacity of the air pump but escaping air also may cause unwanted audio interference with the fidelity of the pickup.

SUMMARY OF THE INVENTION

By means of the present invention the problems associated with prior art radial air-bearing phonograph pickups are solved by the provision of a unique fluid-bearing tone arm support system which allows free radial traverse and vertical pivotal motion of the stylus while consuming a minimum of fluid. In one embodiment of the system of the invention, a horizontally disposed support member having an upward directed surface the shape of a circular trough forms a guide for a floating member. The lower surface of the floating member is recessed to form a hollow plenum which has peripheral surfaces juxtaposed to and of a convex shape matching that of the upper surface of the support member. Pressurized air or other suitable gaseous fluid is supplied to the plenum through one or more openings in the support member to form an essentially constant pressure reservoir from which the fluid leaks about the periphery of the plenum producing uniform fluid flotation of the floating carriage member. The plenum reservoir extends for a sufficient length along the axis of the support member such that all the fluid supply openings remain in communication with the plenum throughout the maximum traverse of the floating member and this stylus across a phonograph record. This minimizes fluid loss, reduces noise, and maximizes efficiency. A flexible multi-conductor ribbon or the like is provided to link the stylus electrically with a conventional signal amplifier system.

In addition, the preferred embodiment is designed to play the underside of the phonograph record. This achieves several advantages over conventional top playing systems. The requirement that the tone arm be clear of the turntable area when disks are removed or replaced is eliminated as is damage to records caused by accidentally dropping or bumping the tone arm.

An alternate embodiment employs a convex support member and a concave floating member and is designed as a conventional top surface tone arm.

BRIEF DESCRIPTION OF THE DRAWINGS

In the drawings wherein like numerals are utilized to depict like parts throughout the same:

FIG. 2 is an enlarged, exploded perspective view of the phonograph pickup system assembly of FIG. 1;

FIG. 3 is an enlarged sectional view of the assembled phonograph pickup system of FIG. 2;

FIG. 4 is an exploded view of an alternate embodiment of the phonograph pickup system of the invention;

FIG. 5 is an enlarged sectional view of the assembled tone arm of FIG. 4;

DESCRIPTION OF THE PREFERRED EMBODIMENTS

Figure 1:
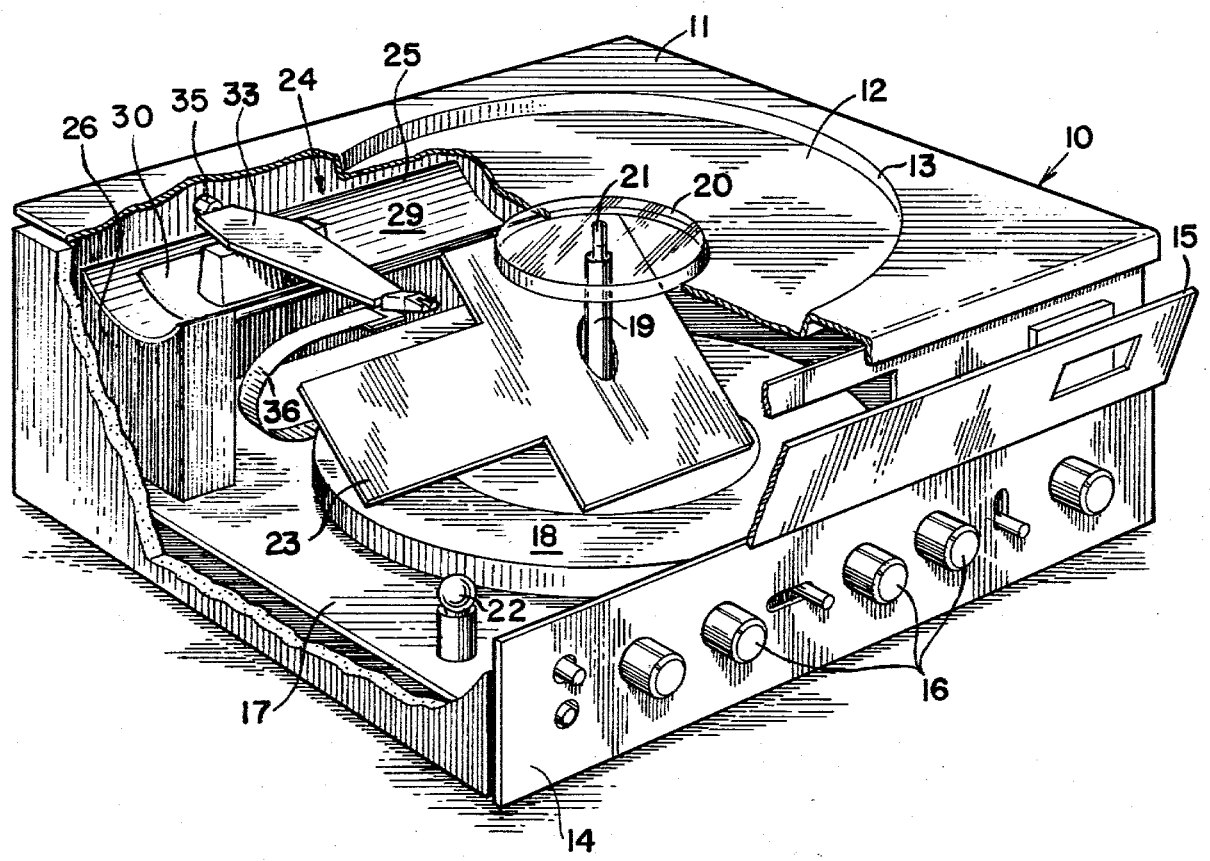
FIG. 1 is a perspective view with parts cut away showing one embodiment of the invention in a phonograph.

In FIG. 1 there is pictured a perspective view of a phonograph equipped with the tone arm of the invention. The phonograph, shown generally at 10, is one which has been modified from the conventional form so that the underside of the phonograph records may be played rather than the upper surface. The cabinet has an upper member 11 which may be recessed as at 12 to receive phonograph records and is made of a greater diameter than a record as at 13 to provide finger recesses to facilitate the addition and removal of records (not shown). Conventional side and rear members and a front panel 14 having a hinged section 15 are shown. An assortment of conventional control knobs, as at 16, are provided.

A chassis support member is shown at 17. The embodiment is provided with a conventional turntable drive member 18 shown having an extended spindle shaft 19 which is, in turn connected to a transparent turntable 20. A record spindle is provided at 21, an interior light at 22 and a mirror at 23.

The preferred embodiment of the phonograph pickup system of the invention is shown generally at 24 and in greater detail in FIGS. 2 and 3. The system includes a lower support 25 having a mounting section 26 and a fluid inlet 27, with outlet opening 28. The upper surface 29 of the lower support 25 is in the shape of a concave circular trough segment much like the inside of a hollow right circular cylinder segment. A floating member 30 is provided which has a recess or plenum 31 formed in its lower surface and open to its underside. The peripheral surface 32 of the recess or plenum 31 is also circular in shape and designed to match the shape of the surface 29 of the support 25 as shown in FIG. 3. A tone arm 33 carrying a pickup 34 is fixed to the carriage support member 30. An adjustable counter balance for the tone arm may be provided as at 35.

The support 25 is mounted on the chassis support 17 such that the axis of the circular cylinder described in part by the surface 29 is horizontal and parallel to a radial line drawn from the center of the record spindle 21 to the outside edge of a phonograph record mounted thereon. The plane of the axis of the circular cylinder described in part by the surface 29 is shown in phantom at 36 and is preferably coincident with the normal plane of the lower surface of a phonograph record to be played. The member 30 is floated on the member 25 in a manner described below. The tone arm 33 is preferably mounted so that its axis is perpendicular to that of the cylindrical support 25 so that the stylus 37 of the pickup 34 describes a radial path across a record as the member 30 travels axially along the member 25.

As mentioned above, the embodiment of FIGS. 1–3 is one designed to play the underside of a phonograph record. The amplifier and speaker systems, and other devices common to phonographs may be any conventional systems and need no further explanation as they form no part of this invention. As previously mentioned, a conventional turntable drive is slightly modified to elevate the driven turntable 21. A slotted opening (not shown) is provided in the member 12 and the turntable 20 is made of a reduced diameter so that the pickoff may be made from the underside by the pickup 34. The interal light 22 in conjunction with the mirror 23 and hinged front panel section 15 allow the position of the stylus to be observed on the underside of the record from without the phonograph. In addition, the turntable 20 is preferably transparent so that the label of the underside of the record may be read in similar fashion. The reverse side of the hinged front panel member may also be mirrored so that observations may be made from above. The two mirror "periscope" serves to give a correct image such that the printing reads correctly, left to right.

An alternate embodiment is shown in FIGS. 4 and 5. That embodiment is similar to the first except that it is somewhat more traditionally designed to play the upper surface of the record. It includes a lower support member 40 having an upper surface 41 generally in the shape of a right circular cylinder section and a gaseous fluid inlet 42 with outlet opening 43. A tone arm carriage member 44 having a recessed lower surface forming a hollow recess or plenum 45 is provided with a periphery or rim surface 46 shaped to match the surface 41. The tone arm 47 and 48 with adjustable counterbalance at 48a, is shown as an integral part of the carriage member 44. This integral unit may simplify the assembly and reduce the cost of the system. Of course, such construction may be used for the first illustrated embodiment in place of multi-piece construction illustrated. A pickup is shown at 49 with pickup stylus 50. As in the first embodiment, the length of the plenum should be such that the opening 43 remains beneath the recess 45 throughout the traverse of the stylus 50 on a phonograph record.

The axis of the right circular cylinder of member 40 again is horizontally mounted parallel to and coplaner with a radial traverse of the upper surface of a phonograph record to be played. The alternate embodiment may be mounted on a conventional turntable motor board in place of a conventional tone arm device without any further modification therein. It may be pivoted or otherwise made movable to permit addition and removal of records.

Figure 6:
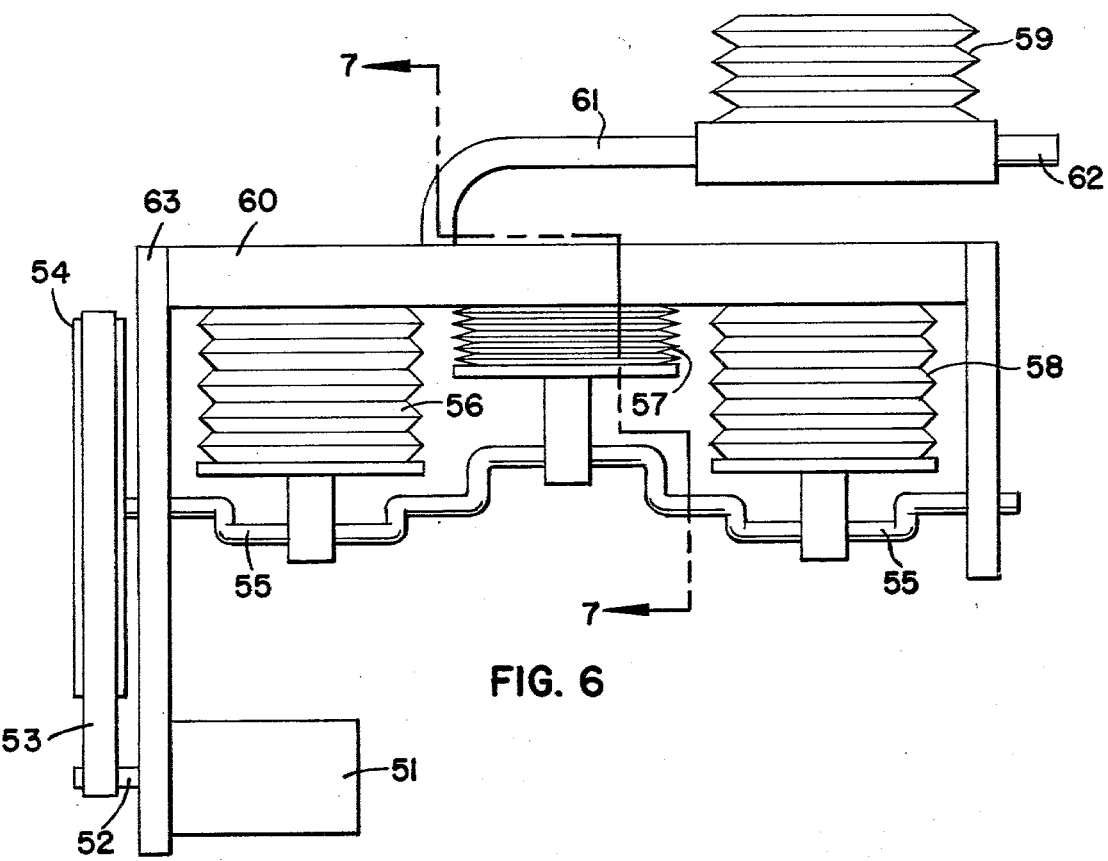
FIG. 6 is a side elevational view of a fluid supply system.
Figure 7:
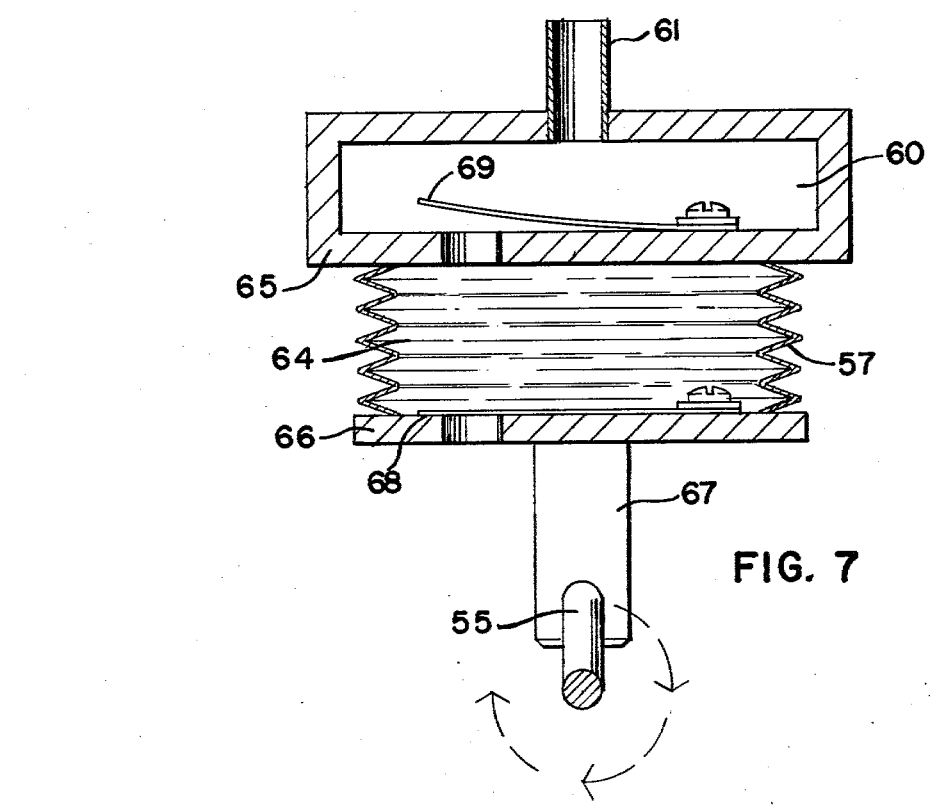
FIG. 7 is a sectional view taken substantially along line 7—7 of FIG. 6.

A pump system for supplying air to the tone arm system of the invention is shown in FIGS. 6 and 7. The device includes a motor 51 which drives a shaft 52 and by means of belt 53 and reducing pulley 54 drives a crankshaft 55. The crankshaft 55, in turn, flexes bellows 56, 57, and 58. These supply air to a constant pressure accumulator bellows 59 by means of common ducts 60 and 61. The accumulator 59 retains a supply of air to be supplied to the tone arm through duct 62 which is connected thereto as by a suitable flexible connector (not shown). The assembly is suitably mounted on a frame 63.

The details of a representative bellows assembly 57 is shown in FIG. 7 including accordian member 64 attached between duct member 65 and driven plate 66 attached to crankshaft 55 by a member 67. A one-way closure member inlet valve 68 and similar outlet valve 69 are also provided.

The three bellows assemblies 56, 57 and 58 are arranged in cooperation with the crankshaft 55 such that during each revolution of the crankshaft 55 the bellows sequentially pump air into the accumulator 59 at approximate intervals of 120° of revolution. The entire air supply system operates at very low pressures and volumes and produces no detectable interference with the phonograph sound reproduction system. One such system has been operated using a power consumption of less than one watt. The use of sequentially operated multiple bellows in conjunction with an expanding accumulator assures a constant supply of air at a uniform pressure which helps to stabilize the flotation of the tone arm of the invention.

The parts of the tone arm embodiments shown in FIGS. 2-5 may be constructed of any conventional materials such as metal or moldable plastic. The matching juxtaposed surfaces 29 and 32 or 41 and 46 should be relatively smooth and closely matched so that both longitudinal motion and free vertical rotational motion of the member 29 are nowhere inhibited and the amount on air escaping is minimized by the corresponding reduction is required clearance. Of course, light weight materials such as molded plastics are preferred for the floating members 30 and 44 as they are fluid supported and lighter materials require less air pressure.

When not in operation the floating member rests on the corresponding support member. After the motor 51 is energized the accumulator is quickly filled and pressurized air is introduced as through the opening 28 or 43. The pumping system including the accumulator are such that the air is maintained at a pressure just sufficient to cause free flotation of the floating member. The recess or plenum 31 or 45 should be of such a length that the corresponding air inlet or openings remain beneath the hollow confines of the chamber throughout the traverse of a phonograph record by the tone arm and stylus. This minimizes the escape and, thus, the consumption of the air or other fluid as all the fluid introduced must escape at the interface of juxtaposed surfaces as at 29 and 32. This minimization is important as it substantially eliminates interference with the audio reproduction of the phonograph associated with escaping air which has been a problem with prior art systems.

The use of the hollow plenum concept also has the added benefit of providing an "air-bearing" type support which in effect contains its own constant pressure reservoir. This has the effect of adding uniformity and stability to the support of the floating member 29 and in turn eliminates problems associated with less stable systems. Thus, an essentially frictionless system is created. The stylus 32, is free to follow a record groove without putting pressure on either side thereof. The free vertical pivotal action of the floating member allows the stylus to accurately follow the vertical variances of the phonograph record turntable combination with great accuracy thus virtually eliminating this form of distortion. It should also be noted the electrical pickup for the system may be a light, extremely thin, flexible multiconductor ribbon which adds little or no horizontal force to the tone arm as the ribbon literally rolls along with the tone arm.

From the above description, it may readily be appreciated that the phonograph pickup device of the present invention provides a stabilized, gaseous fluid supported system which reduces fluid leakage, eliminates most skating effects and has the ability to accurately follow vertical idiocyncrocies in a rotating phonograph record. The cross-references application describes a control system which may be used in the control of the tone arm of the present invention.

The embodiments of the invention in which an exclusive property or right is claimed are defined as follows:

1. A phonograph tone arm system comprising:
   low friction tone arm support means, said support means further comprising:
   support member defining a linear substantially horizontal path of travel having an axially curvilinear upper surface in the form of a circular cylinder segment;
   floating member supported above and disposed to travel along said support member, said floating member having an axially curvilinear lower surface juxtaposed and matching the shape of said upper surface of said support member, said lower surface of said floating member having an elongated recessed area therein defining with said upper surface of said support member a hollow plenum;
   fluid supply means for supplying an amount of pressurized gaseous fluid to said plenum chamber through at least one fluid supply opening in said support member sufficient to produce free flotation of said floating member above said support member and wherein the longitudinal dimension of said plenum in cooperation with the said at least one fluid supply opening is such that the said at least one fluid supply opening is in communication with said plenum at all times during normal linear displacement of said floating member to play a storage medium such that fluid escapes only about the peripheral edges of said plenum;
   tone arm means carried by said floating member said tone arm means including pickup means adapted to traverse a phonograph record along a radial path during the linear displacement of said floating member;
   signal conducting means for conducting signals from said pickup means to a signal processing means.

2. The apparatus of claim 1 wherein the supper surface of said support member is in the shape of a concave circular trough and the juxtaposed lower surface of said flotating member has a matching convex form peripheral to said recess and wherein said support member is disposed beneath the level of a phonograph record to be played such that said pickup means may play the lower surface of a phonograph record.

3. The apparatus of claim 1 wherein the upper surfaces of said support member is convex circular cylinder segment and the juxtaposed lower surface of said flotating member has a matching concave form peripheral to said recess such that said pickup means may play the upper surface of a phonograph record.

4. The apparatus of claim 1 wherein the axis of said circular cylinder of said support member is coincident with the plane of the phonograph record to be played.

5. The apparatus of claim 1 wherein said tone arm and said floating member comprise a unitized structure.

6. The apparatus of claim 1 including flexible electrical conduit means for conducting the signals from said pickup to an amplifier system.

7. The apparatus of claim 1 wherein said fluid supply means further comprises:
   motor driven positive displacement air pump means;
   expanding accumulator means for storing a supply of air;
   conduit means for supplying air from said accumulator to said support means.

8. The apparatus of claim 7 wherein air pump means includes a plurality of bellows sequentially driven by a common crankshaft.

9. The apparatus of claim 8 wherein said air pump means is integral with said phonograph tone arm system.

* * * * *